United States Patent [19]

Young

[11] 4,213,932
[45] Jul. 22, 1980

[54] APPARATUS AND METHOD OF MOLDING A BICONICAL SOCKET

[75] Inventor: William C. Young, Middletown, N.J.

[73] Assignee: Bell Telephone Laboratories, Incorporated, Murray Hill, N.J.

[21] Appl. No.: 918,412

[22] Filed: Jun. 23, 1978

[51] Int. Cl.² .............................................. B29F 1/00
[52] U.S. Cl. .................................... 264/236; 249/144; 249/145; 249/146; 249/184; 264/232; 264/328; 264/343; 425/DIG. 10
[58] Field of Search .............. 264/328, 236, 232, 343; 425/DIG. 10; 249/57, 144, 145, 146, 184

[56] References Cited

U.S. PATENT DOCUMENTS

| | | | |
|---|---|---|---|
| 2,026,996 | 1/1936 | Raflovich | 425/403 |
| 3,314,266 | 4/1967 | Werther et al. | 72/256 |
| 3,579,805 | 5/1971 | Kast | 29/447 |
| 4,075,273 | 2/1978 | Liautaud | 264/328 |

Primary Examiner—James H. Derrington
Attorney, Agent, or Firm—John K. Mullarney

[57] ABSTRACT

An apparatus and method of molding a biconical socket (FIG. 1) of precise concentricity and length. The biconical socket is formed by a two piece mandrel assembly (20, 21), each mandrel member having a frustoconical end (22, 23). The frustoconical ends of the mandrel members are abutted and aligned by means of a coaxially extending pin (24) in one member which engages a hole (25) in the second member. The pin is fabricated from a dissimilar material so that at the elevated molding temperature the clearance between pin and hole is substantially reduced, thereby providing precise concentricity. During molding the pressure of the mold material forces the mandrel members slightly apart against predetermined stops (32, 33) to provide a socket of precise length (L). The resulting biconical socket is particularly well-suited for use in an optical connector assembly.

7 Claims, 7 Drawing Figures

APPARATUS AND METHOD OF MOLDING A BICONICAL SOCKET

TECHNICAL FIELD

The present invention relates to an apparatus and a method for molding a biconical socket which is particularly well suited for use as part of an optical connector.

BACKGROUND OF THE INVENTION

In recent years, numerous advances have been made in the art of molding. Development of new molding techniques, compounds and material alloys for mold construction have steadily increased the level of technology. For example, various chromium plated alloys are now used to provide wear resistance to mold apparatus. One text entitled "Plastic Mold Design" by Bebb, published by the Plastics Institute in 1962, depicts in Chapter 5 a myriad of alloys available.

In the area of optical fiber connectors, however, the degree of precision required exceeds the tolerance limits available with existing molding techniques. One such optical connector, disclosed in a patent application to P. K. Runge, Ser. No. 630,930, filed Nov. 11, 1975, and assigned to the present assignee, discloses the use of a sleeve having a biconical aperture to precisely align two tapered male connector members. Each such male member contains an optical fiber.

For telecommunications applications, it is desirable for the optical losses through the optical connector to be less than 0.4 dB. To attain such limits, the total radial offset between each conical aperture in the sleeve must be equal to or less than 0.0001 inch ($2.54 \times 10^{-4}$ cm). Moreover, the end separation requirement between optical fibers must not exceed 30 microns ($11.81 \times 10^{-4}$ in). The molding of a biconical sleeve for such optical connectors, therefore, requires extreme precision on sleeve length and concentricity of the intersecting tapers.

The fabrication of a biconical aperture through the use of a two piece mandrel is known in the molding art. Such use is also disclosed, for example, in U.S. Pat. No. 3,314,266 to O. Werther et al, issued Apr. 18, 1967 for a method of making pipe coupling blanks. In Werther et al, two truncated tapered cylinders of revolution are inserted into each end of a coupling blank to size the internal diameter. The Werther et al method of making pipe coupling blanks is hardly suitable, however, for making an exceedingly precise biconical socket for optical fiber connector purposes.

SUMMARY OF THE INVENTION

Pursuant to this invention, a sleeve having a biconical aperture is fabricated through the use of a two piece mandrel. Each mandrel piece has a frustoconical end. The frustoconical ends are initially aligned through the use of a coaxially extending pin which protrudes from the frustoconical end face of one mandrel piece and is slidably engaged by a mating hole in the frustoconical end face of the second mandrel piece. The precise concentricity requirement is achieved by the use of a pin fabricated from a dissimilar material so that at elevated molding temperatures the clearance between the pin and hole is substantially eliminated. This reduced clearance, however, is precisely controlled by initial tolerancing so that under the pressure produced by the mold material both mandrels are capable of sliding apart against predetermined stops to produce a sleeve of precise length as well as precise concentricity.

It is a feature of the present invention that a biconical sleeve can be fabricated to provide a predetermined degree of optical attenuation in a transmission path, at any location where an optical connector can be placed. In optical transmission systems, such attenuation is required to provide a preselected signal level at the interface between the optical fiber and repeaters or other terminal equipment. The necessary attenuation can therefore be supplied by a modification of the otherwise required optical connector rather than by a separate piece of equipment.

DETAILED DESCRIPTION

Figure 1:
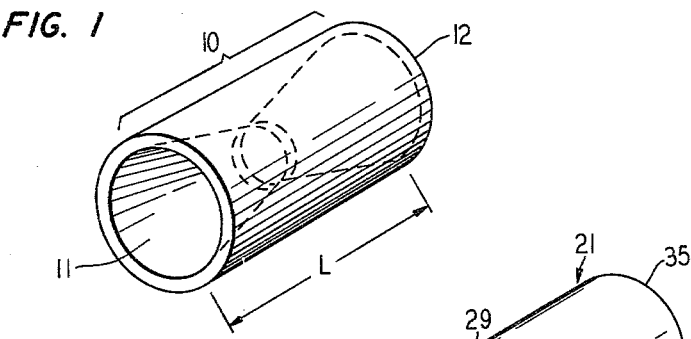
FIG. 1 shows a biconical socket constructed in accordance with the present invention.

FIG. 1 of the drawings shows a biconical socket 10, with precisely aligned frustoconical apertures 11 and 12, constructed in accordance with the present invention. Socket 10 is also of a precise length L. Economical sockets 10 have been fabricated in accordance with the present invention by molding a silica and glass-filled epoxy compound, such as HYSOL MH9-02. Apertures 11 and 12 are formed using the mating pair of mandrel members 20 and 21 shown in FIG. 2. Mandrel members 20 and 21 each have a cylindrical portion 28 and 29 terminating in a cylindrical end 34 and 35, and a frustoconical end 22 and 23, respectively. Shoulder 26 on mandrel member 20 and shoulder 27 on mandrel member 21, formed at the intersection of the frustoconical and cylindrical surfaces, serves to provide sealing during the molding process and defines the end wall thickness of the socket. In addition, member 20 has a coaxially extending pin 24 designed to slidingly engage the centrally disposed hole 25 in the frustoconical end 23 of member 21. To facilitate the engagement of pin 24 and hole 25, pin 24 can be advantageously provided with a slight taper.

Precise alignment of apertures 11 and 12 is accomplished by fabricating pin 24 from a material having a greater thermal coefficient of expansion than that of the material used for mandrel members 20 and 21. As a result, at an elevated temperature of molding, approximately 300 degrees Fahrenheit (148.89 degrees Centigrade), the clearance between pin 24 and hole 25 is substantially reduced. Satisfactory models of the mandrel assembly of FIG. 2 have been made using steel mandrel members and a brass pin 24. Sockets having a total radial offset between apertures 11 and 12 of less than 0.0001 inch ($2.54 \times 10^{-4}$ cm) are routinely attained using the above-described mandrel assembly. The described mandrel assembly also provides a biconical socket 10 of precise length L when used in the molding process discussed, infra.

Figure 2:
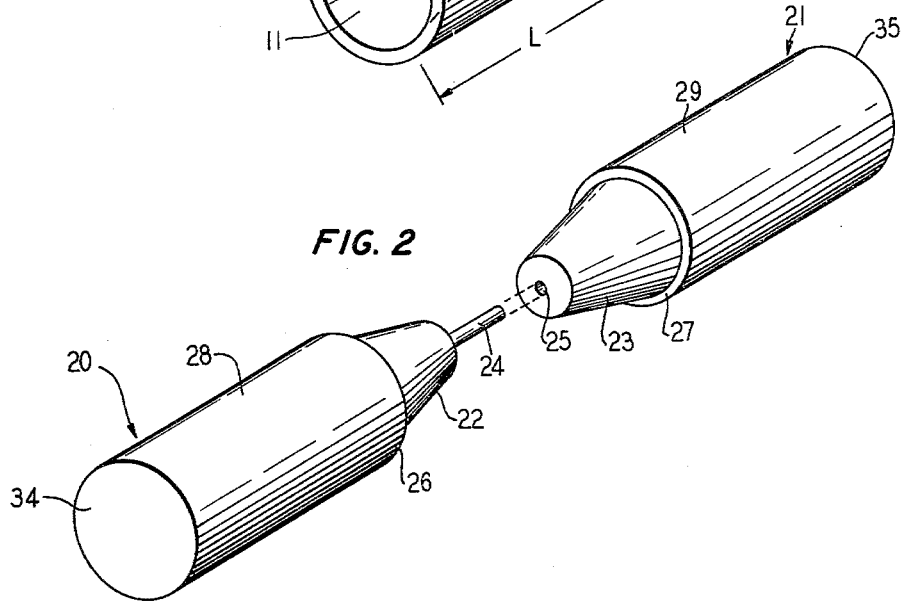
FIG. 2 shows a perspective view of the apparatus of the invention, to wit: a pair of mandrels used for producing the biconical socket of FIG. 1.
Figure 3:
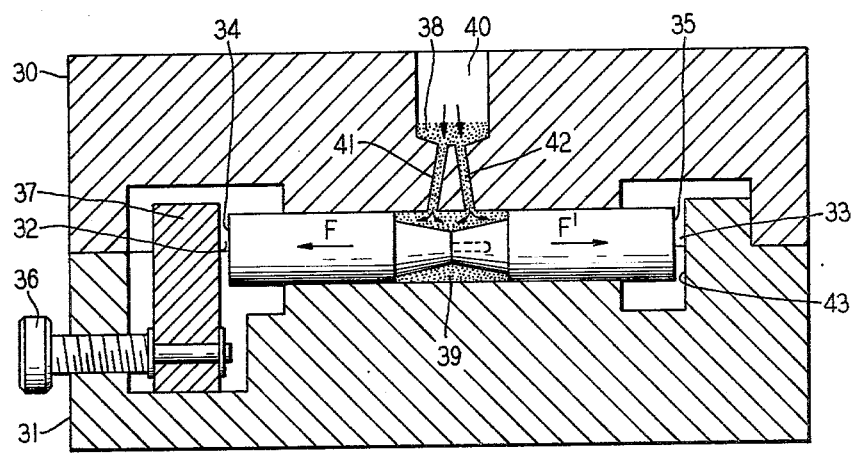
FIG. 3 illustrates the mandrels of FIG. 2 mounted within a mold cavity in accordance with the invention, the mold being shown in cross-section.

FIG. 3 shows the mandrel assembly of FIG. 2 mounted within the mold cavity formed by mold halves 30 and 31 so as to permit the subsequent sliding apart of each mandrel member. As illustrated, a gap 32, 33 exists between each member end 34, 35 and the surrounding mold half material. Gaps 32 and 33 may be varied by the location of the mandrel assembly within the mold half 31 along with the adjustment of lead screw 36 connected to movable stop 37. Typically, the total gap, i.e., 32 and 33, is 0.0015 inches ($38.10 \times 10^{-4}$ cm).

During the molding operation, mold material 38 is injected under pressure of 1500 pounds per square inch into cavity 39 through space 40 and runners 41 and 42. The injected material 38 leaving runners 41 and 42 produces opposing forces F and F'. Forces F and F' act on mandrel members 20 and 21, moving said members against the movable stop 37 and fixed stop 43 thereby precisely fixing the length L of the optical socket. Using this technique, sockets having a given length L within ±0.0004 inch ($1.016 \times 10^{-4}$ cm) have been produced.

When the mold material hardens, the molded socket 10 along with members 20 and 21 are removed from the mold halves. After the mandrel assembly has cooled, separation of members 20 and 21 is easily accomplished. Any flashing, i.e., extraneous molding material can be removed by scraping, breaking or other conventional techniques. Each socket is then post cured in a furnace at 175 degrees Centigrade (253.2 degrees Farenheit) for one hour to complete the cross-linking of the mold material. This step is followed by a soaking of each socket in distilled water for six hours so as to saturate the mold material and minimize any subsequent expansion due to humidity variations during service.

Figure 4:
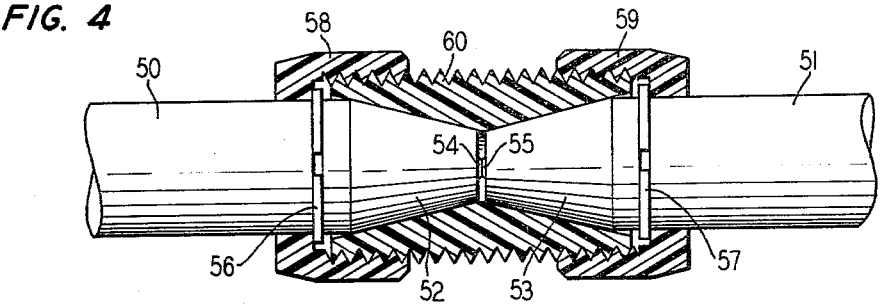
FIG. 4 depicts a sectional view of the biconic socket and associated male plugs and retaining hardware assembled to produce a low-loss optical connection.

An optical connector assembly using a biconical socket is depicted in FIG. 4. Male plug 50 having frustoconical end 52 and male plug 51 having frustoconical end 53 are precisely aligned by means of biconical socket 60. Both plugs 50 and 51 contain an optical fiber that terminates in a compressible dome 54 and 55, respectively, as disclosed in the above-cited application of P. K. Runge. To insure a low loss optical connection, domes 54 and 55 are held in a slightly compressed state by means of retaining clips 56 and 57 and locking nuts 58 and 59. The latter two elements, nuts 58 and 59, engage the male threads advantageously provided on socket 60. These threads, as will be obvious to those skilled in the art, are preferably formed during the molding process by appropriate features in the walls of the mold cavity. Alternatively, the threads can be machined subsequent to molding.

Figure 5:
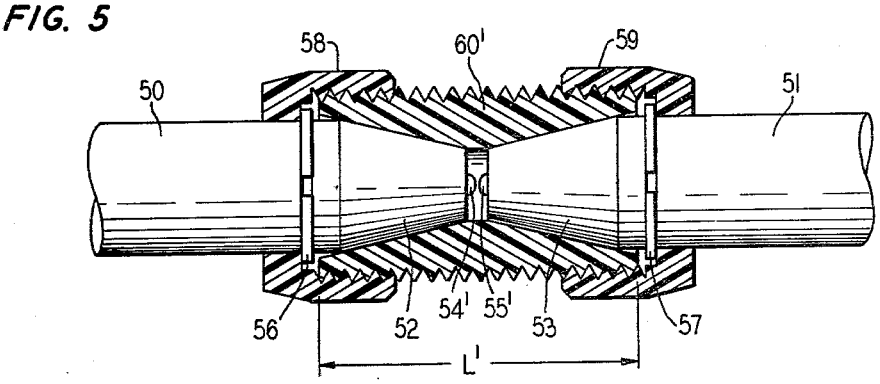
FIG. 5 illustrates a similar assembly as in FIG. 4 wherein the biconic socket provides a fixed amount of optical attenuation.

FIG. 5 shows a similar assembly wherein a predetermined amount of optical attenuation may be introduced into the transmission path through a modification of the biconical socket. In FIG. 5, socket 60' is purposely fabricated with a predetermined longer length L'. This modification may be easily accomplished by appropriately adjusting lead screw 36, shown in FIG. 3, prior to molding socket 60'. Due to the increased length L' of socket 60', domes 54' and 55' are not compressed as their counterparts 54 and 55 shown in FIG. 4. The resulting slight increase in end separation between the optical fibers in plugs 50 and 51 produce attenuation of the optical signal. Typically, for a 20 dB loss the length L' of socket 60' is increased approximately 0.070 inches (0.177 cm) over the nominal length L. While this value of attenuation is suitable for certain applications, other amounts of attenuation can be readily produced by suitable length adjustment of the biconical socket. Any such attenuation socket can, of course, be identified by a color additive to the molding compound.

Figure 6:
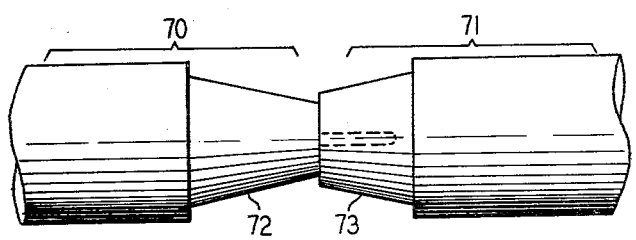
FIG. 6 shows a variation of the mandrel assembly which is used to produce a further embodiment of the biconical socket, as illustrated in FIG. 7.
Figure 7:
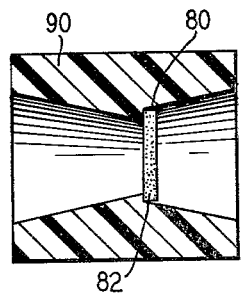

Another embodiment of the present invention is shown in FIG. 6, which is used to produce the biconical socket of FIG. 7. To produce a biconical socket having an internal seat 80, the frustoconical end 73 of mandrel member 71 is shorter than the opposing frustoconical end 72 of mandrel member 70. Alignment of members 70 and 71 and the method of molding are identical to the techniques previously discussed. The resulting biconical socket 90 having an internal seat 80 is illustrated in FIG. 7. Socket 90 may be used in an assembly similar to those illustrated in FIGS. 4 and 5. Seat 80 may be used for positioning septum 82 which can be fabricated from a translucent material so as to introduce attenuation into the optical path. Alternatively, septum 82 can be a filter or wafer soaked in an index matching fluid to improve the optical transmission.

As will be obvious to those skilled in the art the brass pin may be disposed in either mandrel member, with the receiving hole in the other, and the internal seat can similarly be provided by shortening either mandrel member.

I claim:

1. A mandrel assembly for molding a biconical socket (10) comprising first (20) and second (21) cylindrical mandrel members, each member having a frustoconical end (22, 23), characterized in that the frustoconical end (22) of said first mandrel member (20) has a pin (24) coaxially extending therefrom, said pin being slidingly accepted by a centrally disposed hole (25) in the frustoconical end (23) of said second mandrel member (21) to permit abutment of said frustoconical ends, said pin being fabricated from a material having a thermal coefficient greater than that of the mandrel material so that at an elevated molding temperature the clearance between said pin and hole is substantially reduced and the frustoconical ends of said first and second mandrel members are thus precisely aligned, said first and second mandrel members being capable of sliding apart under the pressure of injected mold material to provide a biconical socket of precise length (L) and as well as precise concentricity.

2. An assembly as defined in claim 1 further characterized by a pair of mechanical stops (37, 43) which precisely limit the sliding apart of said mandrel members (20, 21), said stops serving to determine the length (L) of the biconical socket.

3. The assembly of claim 2 including means for increasing the distance that the stops are spaced from each other, whereby the length of the socket is increased to provide a predetermined amount of optical attenuation.

4. The assembly of claim 2 wherein the frustoconical end (73) of one mandrel member (71) is shorter than the opposing frustoconical end (72) of the other mandrel member (70) so as to produce a biconical socket (90) having an internal seat (80).

5. The assembly of claim 2, 3 or 4 further characterized by a mold cavity in which said mandrel members are disposed for molding purposes, the walls of said mold cavity being fabricated to produce engageable threads on the cylindrical external surface of a molded biconical socket.

6. A method of molding a biconical socket (10) of precise length (L or L') and concentricity characterized by the steps of inserting a mandrel assembly within a mold cavity, said mandrel assembly having a first mandrel member (20) with a frustoconical end (22) and a second mandrel member (21) with a frustoconical end (23), said frustoconical end of the first mandrel member having a pin (24) coaxially extending therefrom, said pin being slidingly accepted by a centrally disposed hole (25) in the frustoconical end of said second mandrel member to permit abutment, said pin being fabricated from a material having a thermal coefficient greater than that of the mandrel member material, heating a preselected mold material to a predetermined temperature sufficient to soften the mold material as well as heat the mandrel material to thereby substantially reduce the clearance between said pin and hole and injecting said mold material into said mold cavity, said mold material being injected into the mold cavity under pressure to produce opposing forces (F, F') parallel to the longitudinal axis of said mandrel members thereby forcing said mandrel members slightly apart, removing said mandrel assembly and the molded biconical socket from said mold cavity, disassembling said mandrel assembly from said socket, post curing said biconical socket at a preselected temperature and time to post cure the material, and soaking the biconical socket in distilled water for a sufficient time to saturate said mold material.

7. A method of molding a biconical socket (10) of precise length (L or L') and concentricity characterized by the step of inserting a mandrel assembly within a mold cavity, said mandrel assembly having a first mandrel member (20) with a frustoconical end (22) and a second mandrel member (21) with a frustoconical end (23), said frustoconical end of the first mandrel member having a pin (24) coaxially extending therefrom, said pin being slidingly accepted by a centrally disposed hole (25) in the frustoconical end of said second mandrel member to permit abutment, said pin being fabricated from a material having a thermal coefficient greater than that of the mandrel member material, heating a preselected mold material to a predetermined temperature sufficient to soften the mold material as well as heat the mandrel material to thereby substantially reduce the clearance between said pin and hole and injecting said mold material into said mold cavity, said mold material being injected into the mold cavity under pressure to produce opposing forces (F, F') parallel to the longitudinal axis of said mandrel members thereby forcing said mandrel members slightly apart, and removing said mandrel assembly and the molded biconical socket from said mold cavity and said socket from said mandrel assembly.

* * * * *